Oct. 31, 1967          R. G. GABRIELSON ET AL          3,350,687
           CONTROL SYSTEM WITH TIME REFERENCE FOR DATA ACQUISITION
Filed Aug. 5, 1963
                                                  7 Sheets-Sheet 1

INVENTORS
Reidar G. Gabrielson
Lawrence R. Smith
BY

ATTY'S.

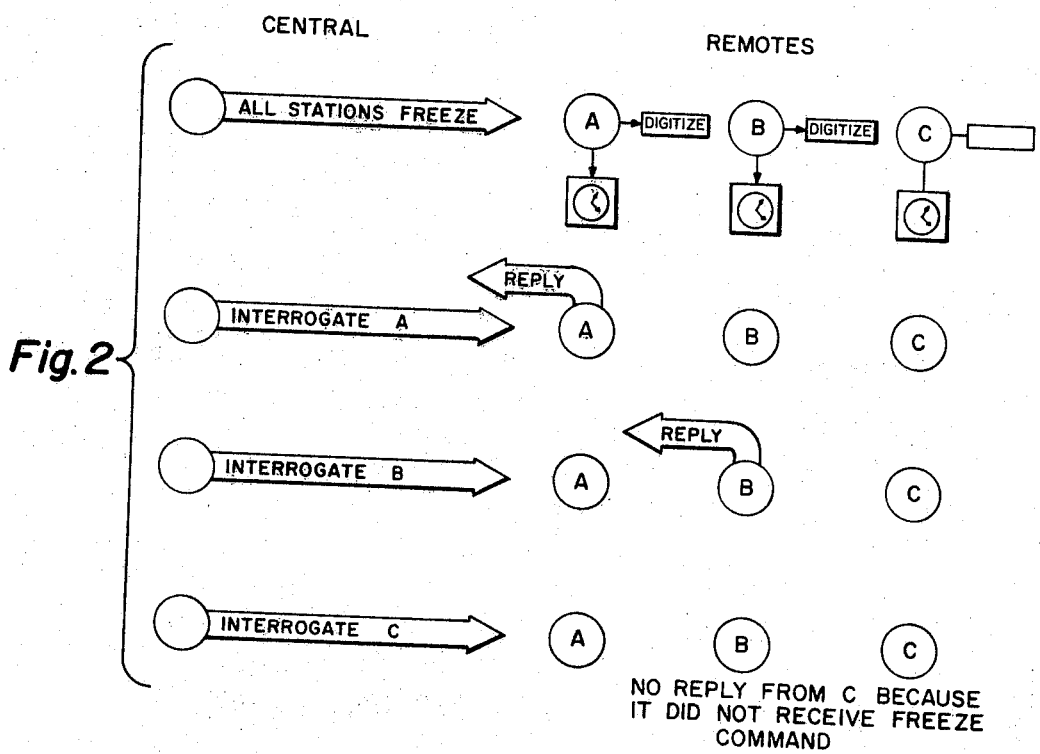
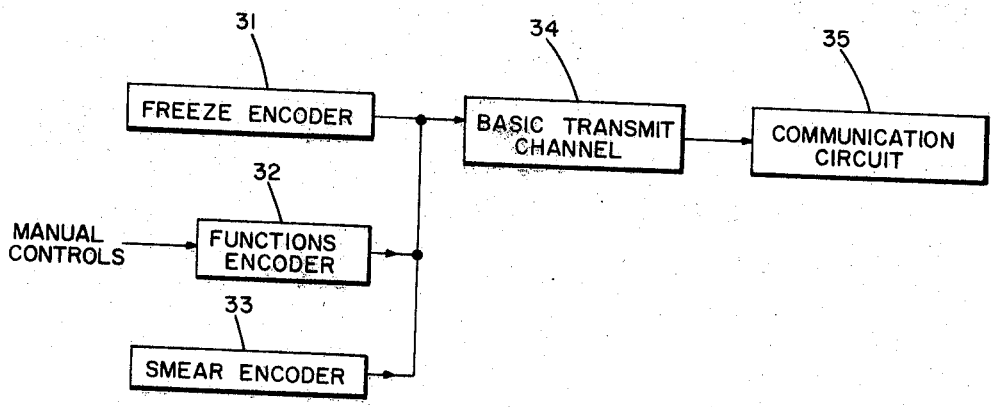

FREEZE COMMAND

INVENTORS
Reidar G. Gabrielson
Lawrence R. Smith

ATTY'S

United States Patent Office 3,350,687
Patented Oct. 31, 1967

3,350,687
CONTROL SYSTEM WITH TIME REFERENCE
FOR DATA ACQUISITION
Reidar G. Gabrielson, Scottsdale, and Lawrence R. Smith,
Phoenix, Ariz., assignors to Motorola, Inc., Chicago,
Ill., a corporation of Illinois
Filed Aug. 5, 1963, Ser. No. 299,727
11 Claims. (Cl. 340—163)

ABSTRACT OF THE DISCLOSURE

A supervisory control system having a central station with a plurality of remote stations. The central station transmits a freeze command with the remote stations being responsive to sense and store digitalized information from sensors at the same time as determined by the receipt of such freeze command. A timing cycle is started in each of the stations during which such stored information may be transmitted from the remote to the central station. At the end of the timing cycle the information in the storage is erased.

---

This invention relates to supervisory control systems, and in particular to time-referenced data acquisition in a supervisory control system.

Supervisory control systems available at the present time have a central station which is usually equipped to acquire both qualitative and quantitative information from the remote stations of the system. Qualitative information is two-state in nature. For example, when a circuit breaker trips or closes, or a pump is turned on or off, the status of the equipment involved is qualitative information. Such information is transmitted from the remote stations to the central station to keep status displays there up to date so that the system can be supervised efficiently.

Quantitative information is associated with continuous variables. At the remote stations of a system, there may be certain types of equipment which require periodic adjustment, such as adjustment of a flow rate set point, adjustment of a line pressure set point, and adjustment of a generator set point. Some of the primary quantities controlled by such equipment are pressure, temperature, liquid-level, power, and flow rate, and these quantities are normally transmitted to the central station when a partial or complete inventory of the system is taken, and also when an alarm condition occurs at a given remote station.

One of the purposes of a system inventory is to acquire data which can be used in calculations, usually done by a computer, which are used in analyzing the performance of the facilities that are supervised and controlled by the system. If these facilities are extensive such that a large number of remote stations are required, perhaps with many primary quantities being monitored at individual remote stations, an inventory of the system may take a fairly long time, even though the transmission speeds are high. Information acquired at the beginning of the inventory then represents a condition which existed at a considerably earlier time than the conditions represented in information acquired at the end of the inventory. The time difference can easily be as great as thirty minutes in a large system.

It would clearly be more desirable to have a system in which all data acquired during an inventory would represent conditions existing at a given time, and it is a primary object of this invention to provide such time-referenced data acquisition in a supervisory control system. This has been accomplished in accordance with the invention by the use of control circuitry at the central and remote stations which causes the system to sample all primary quantities at a given time and store the quantitative information so obtained for subsequent transmission to the central station on a programmed or operator-controlled basis. The stored information can be acquired only during a limited time, however, and this time limitation is placed on the interrogating so that if a remote station fails to receive the command calling for storage of current information, it will not then send back old stored information in response to interrogation.

The time-referenced data acquisition features of an illustrative embodiment of the invention will be described in detail with reference to FIGS. 1 through 10 of the accompanying drawings. First, however, an over-all system will be described in order to provide background information with which the invention may be better understood.

In the drawings:

FIG. 2 is a word picture showing schematically the manner in which data is acquired on a time-referenced basis in the system of FIG. 1;

FIG. 3 is a simplified block diagram of a portion of the central station of FIG. 1;

General system description

Figure 1:
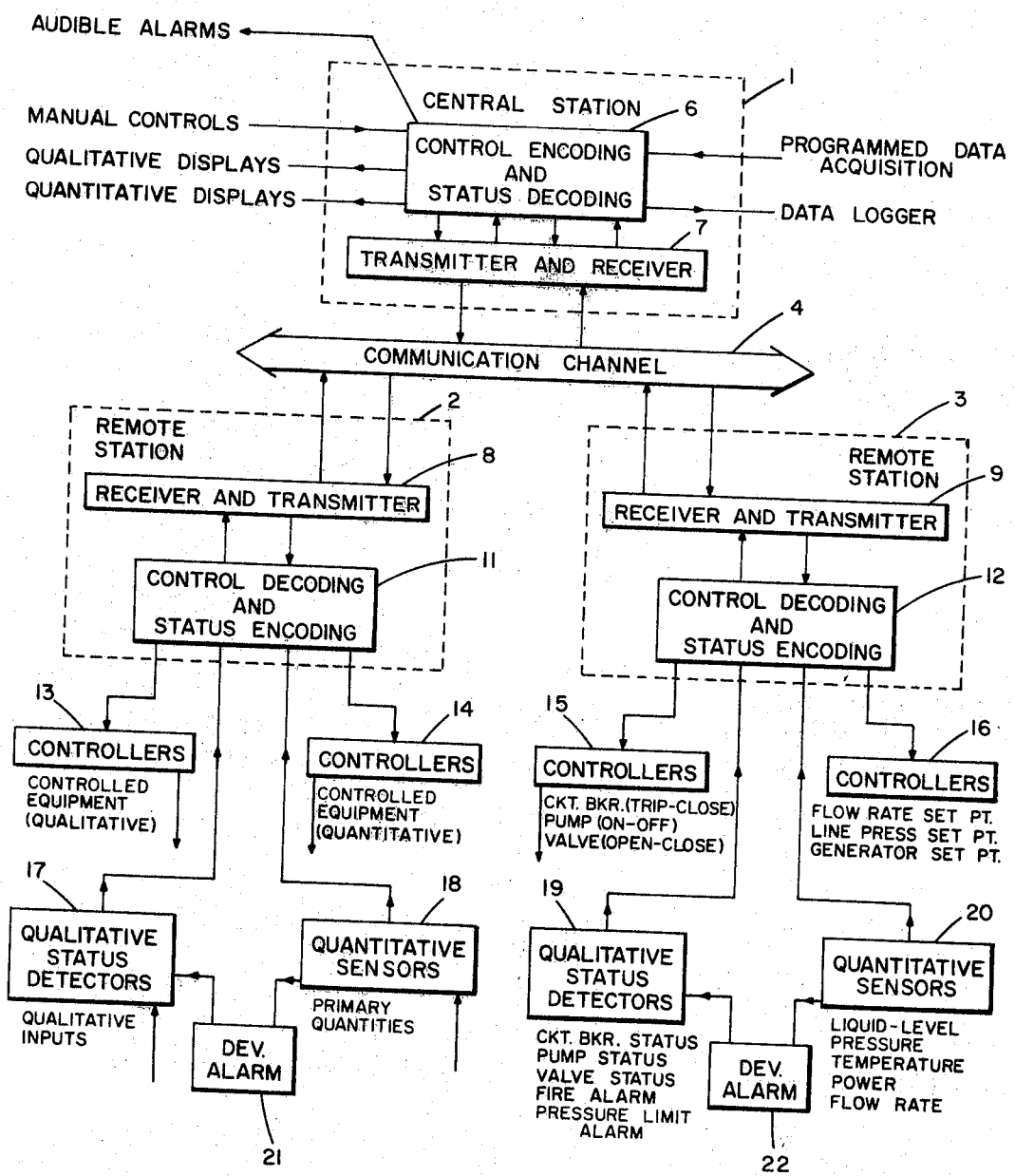
FIG. 1 is a block diagram of a supervisory control system in which time-referenced data acquisition in accordance with the invention may be used.

Referring first to FIG. 1, there is shown a supervisory control system in which time-referenced data acquisition in accordance with the invention may be used. The system of FIG. 1 includes a central station 1 and remote stations 2 and 3. Only two remote stations have been shown, but any desired number of remote stations may be used within practical limits. Messages are transmitted between the central station and the remote stations via the communication channel 4, which has been represented schematically in FIG. 1. The communication channel may be any of several available types; for example, telemetering, teletype, telephone voice line, microwave, VHF or UHF radio.

The particular system shown in FIG. 1 is a digital-type, pulse-code-operated telemetering system, specifically designed for centralized supervision and control of unattended, remotely located distribution facilities, such as petroleum and natural gas pipe lines, power grids, and water conveyance networks. The system is flexible in functional configuration and can include many diverse supervisory and control options. It will be apparent from the description which follows that the utility of the invention and its scope are not limited to the specific embodiment shown in the drawings.

The messages which are transmited between the central station and the remote stations are coded in binary form. A digital system uses discrete data expressed as digits in a decimal or some other system of counting. Binary coded message "bits" are used to encode the discrete data. A primary advantage of binary coding, as described above, is that it uses only two states to encode the discrete information—binary one and zero. If an information bit is not a one, it must be a zero, and vice versa.

A wide variety of methods are available for encoding the desired control commands and data into digital form. The system described herein uses three different codes, depending on the ultimate use or function to be accomplished. These codes are: (1) 2/N code, (2) unitary or discrete bit code, and (3) binary-coded-decimal. All of these codes are handled identically in the transmission and reception phases of the system, and their value—the information they contain—is a function of the operation to be performed.

A digital message can be encoded by assigning binary one to two specific bits in the message and leaving all the rest of the bits zero. Thus, a distinct meaning can be obtained for each combination of one-bit locations. This technique is called 2/N (2 out of N) coding, where N is the total number of bits in the message. A distinct advantage of this coding is the convenience with which it can be implemented using multiaperture core circuits.

The incoming message is checked, and if the equipment recognizes that something has happened to the message, no control action takes place. The control equipment cannot tell what has happened to the message—only that something is wrong and that the message should be ignored.

The formula which gives the number of valid combinations in a code unit of N bits is as follows: N/2 (N−1). Thus, a code unit of five bits could have 5/2 (5−1) or ten unique arrangements of two one-bits and three zero-bits.

Because of the high degree of inherent security against mutations and errors of transmission, the 2/5 code is utilized in the illustrative embodiment to select specific command functions; e.g., open or close valve regulators, trip or close circuit breakers, etc. It is also used for station addressing and identification. A coding diagram for a typical 2/5 code is as follows:

TABLE I.—ONE AND ZERO BIT POSITIONS

| DIGITS | 1 | 2 | 3 | 4 | 5 |
|---|---|---|---|---|---|
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

Most of the data returned from remote stations to the central station is qualitative which inherently is binary in form. Accordingly, this binary information is inserted into the message structure in its original form. For example, a circuit breaker may be assigned to a certain bit position in a message. If this breaker is open, the bit is encoded as a zero. If the breaker is closed, the bit is encoded as a one. Such a code format is called unitary or discrete bit coding; each bit stands on its own, regardless of the over-all message length.

For the 2/5 code described above, it is necessary to examine all five bits simultaneously to determine one of ten possible valid combinations. In the unitary code, each bit contains the complete on-off, open-closed status of its associated equipment without regard to the other message bits.

The third type of coding used in the illustrative embodiment is binary-coded-decimal. Such coding is used in the transmission of quantitative data and involves asssigning a numerical weight, or value, to each bit relative to its position within a group of bits. A common weight used in digital application is the base 2 raised to some power; e.g., $2^0$, $2^1$, $2^2$, $2^3$, etc. The exponent determines the numerical weight assigned to the bit location. If the bit is a one, the numerical weight of that bit is the base to the assigned power. If the bit is a zero, the numerical weight of that bit is zero.

Two typical methods of pulse keying which can be used for transmitting the binary data are return-to-neuter keying and pulse-duration keying. Return-to-neuter keying will be described herein for illustration, but it will be understood that other suitable methods are available.

The transmission preferably contains three types of bit information: binary one, binary zero, and neuter. When the return-to-neuter keying method is used with the system of FIG. 1, neuter is established as the center frequency. A binary one bit is transmitted as a frequency burst on one side of the neuter frequency, and a binary zero bit is transmitted as a frequency burst on the other side of the neuter frequency. A burst of the neuter frequency is spaced between each of the successive binary bits. Such transmissions have constant duration pulses.

In FIG. 1, the basic components and sub-systems of the preferred embodiment are represented by blocks. At the central station 1, there is a control encoding and status decoding sub-system 6, and transmitting and receiving equipment 7. Messages for control and interrogation functions are encoded at the central station 1 and transmitted over the communication channel 4 to the remote stations 2 and 3. The system can be designed for manual, semi-automatic, or fully automatic interrogation and control of remote stations. The selection of the degree of automatic operation to be designed into a system is largely a matter of choice; however, some degree of automatic operation is usually preferred where data logging functions are included in the system.

In manual operation, the operator selects and interrogates remote stations individually in order to obtain quantitative information. In semi-automatic operation, the remote stations are scanned in a programmed sequence. The operator initiates scanning, but after that, all operations are automatic. In the fully automatic mode of operation, the remote stations are automatically scanned to obtain quantitative data at fixed time intervals, and no operator action is ordinarily required. However, the operator may initiate an unscheduled check of the entire system or of individual remote stations at any time.

In each case (i.e., manual, semi-automatic and automatic), the system operates an open-ended quiescent system such that a transmission of qualitative information is initiated any time there is a change at a remote station. Thus, operator-initiated transmissions to obtain qualitative status information from the remotes are not ordinarily necessary.

The remote stations 2 and 3 have receiving and transmitting equipment 8 and 9 and control decoding and status encoding sub-systems 11 and 12. Incoming messages addressed to the remote station 2 are received, decoded and routed to one of the two types of controllers 13 and 14 included in that remote station. The controllers 13 are for controlled equipment where the control action is qualitative and the controllers 14 are for controlled equipment where the control action is quantitative, as indicated at the outputs of the controllers 13 and 14.

The remote station 3, and all other remote stations, also have the same two types of controllers. The controllers for the remote station 3 are designated 15 and 16 in FIG. 1, and specific examples of the two types of controlled equipment (qualitative and quantitative) have been indicated at the outputs of the controllers 15 and 16. It will be apparent that the control action for the qualitative type is a two-state action. The control action for the quantitative type is a continuous function, and specific examples of this type of control are adjustment of a flow rate set point, adjustment of a line pressure set point, and adjustment of a generator set point, as previously mentioned.

There are two types of inputs at the remote stations: qualitative inputs which are fed to the qualitative status detectors 17, and quantitative inputs which are fed to the quantitative sensors 18 for the remote station 2. Specific examples of these two types of inputs are shown at the input lines leading to the qualitative status detectors 19 and the quantitative sensors 20 for the remote station 3. In the qualitative category, the examples shown are circuit breaker status, pump status, valve status, fire alarm and pressure limit alarm. In the quantitative category, the examples shown are liquid-level, pressure, temperature, power and flow rate.

For data acquisition and logging purposes, the remote stations are interrogated by the central station, and quantitative information in signal form is supplied from the sensors 18 and 20 to the encoding section of the subsystem 11 and 12 where it is encoded into messages. The messages are transmitted to the central station where they are decoded and displayed, and a data logger for such quantitative information may also be provided as indicated at the corresponding outputs for the central station.

An example of a deviation detection and alarm subsystem 21, 22 which may be used in the supervisory control system of FIG. 1 is described and claimed in a copending application of Lawrence R. Smith, Ser. No. 258,992, filed on Feb. 18, 1963, and assigned to the present assignee, now U.S. Patent 3,305,786.

The manner in which qualitative status information is detected at the remote stations, transmitted to the central station and displayed on qualitative displays is apparent from inspection of FIG. 1. Likewise, the manual control input and the programmed data acquisition input at the central station are self-explanatory.

*Data acquisition with time reference*

FIG. 2 is a word picture, something like a flow chart, illustrating the manner in which data is acquired by the central station from remote stations on a time-referenced basis. In each line of the drawing, the central station is shown at the left, and three remote stations identified A, B and C are shown at the right.

Starting with the first line of FIG. 2, the central station is shown sending a uniquely coded command, called a "freeze" command, to all remote stations of the system. All remote stations are equipped to receive and decode the freeze command, but it is possible that one or more stations will fail to receive it due to fading, interference on the communication channel, distortion or the like. Since such conditions may easily occur in a system having widely separated remote stations, stations A and B are shown receiving the freeze command in FIG. 2 and station C is shown failing to receive it.

The freeze command causes stations A and B to digitize and store at the same reference time the primary quantities monitored there. Each of the remote stations has a timer, called a permissive timer, and the freeze command starts the timers at stations A and B. Station C neither digitizes its primary quantities nor starts its permissive timer because it has not received and decoded the freeze command.

Next, the central station begins to take an inventory of the system. The second line of FIG. 2 shows the central station interrogating station A, and this remote station replies with the quantitative data which was stored at the reference time. The quantitative data which was stored at the same time at station B is acquired by an interrogation command from the central station and a reply from station B as shown in the third line of FIG. 2. In the last line of FIG. 2, the central station is shown interrogating station C, but that remote station does not reply because it did not receive the freeze command.

It is actually the permissive timer of station C which prevents it from replying to the interrogation command. The timer must be activated in order for the remote station to reply to interrogation by the central station. If a remote is interrogated for quantitative data either when its permissive timer has not been started or after the permissive timing cycle has terminated, that remote will not reply. This prevents the remote from sending back old information contained in its storage and avoids the difficulties of resetting the storage of the remote station at the end of each reply.

When the central station fails to receive a reply from station C after the first interrogation, it may repeat the interrogate command as many times as required to give a desired degree of assurance that a reply simply has not been lost in transmission. If no reply comes back after the repeat interrogations, the central station records that fact, for example, by printing out a series of X's in its data logging equipment, and then continues inventorying the rest of the remote stations, if any.

FIG. 3 is a simplified functional block diagram for the transmitting terminal of the central station. Three types of messages are encoded by the three encoders 31, 32 and 33 shown in FIG. 3. The messages are all routed through a basic or common transmitting channel 34 to the communication circuit 35 which includes a transmitter and go from there to the remote stations via the communication channel. The freeze commands originate from the freeze encoder 31. Suitable coding for a freeze command is shown by means of a diagram in FIG. 4, and this diagram will serve to illustrate in a general way the coding scheme used for all messages in the particular embodiment being described.

In this embodiment, the basic unit of digital information consists of five binary bits. The unit of information is defined as a digit. Three types of digit codings are used as follows:

| Digit Type | Coding | Unique Combinations |
|---|---|---|
| Decimal | 2/5 | 10 |
| Unitary | None | 5 |
| Binary-Coded-Decimal | Weighted | 32 |

In the 2/5 coding used for decimal digits, each digit consists of two ones and three zeros, and their sequence carries the information. For digits encoded in binary-coded-decimal (BCD), five bits are weighted 1–2–4–8–16.

Figure 4:
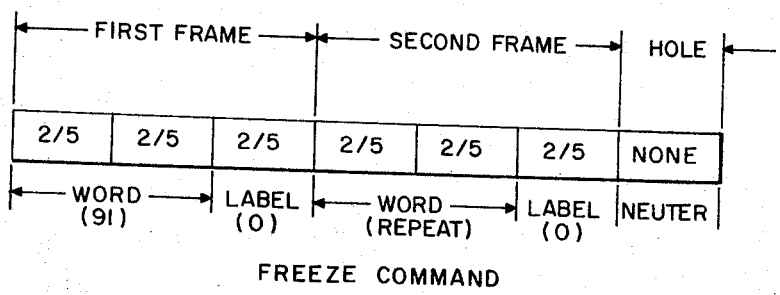
FIG. 4 shows the structure of an all stations command which causes the remote stations to obtain and store quantitative data at a given reference time.

As shown in FIG. 4, a message consists of two identical, successive message frames followed by a "hole." Each frame consists of a word, followed by a label for identifying the message type. For instance, the particular system being described has a capability for ten different message types, so the decimal digit of the label may be any number from zero through nine. This number is encoded in binary form using a 2/5 code. The decimal digit assigned to freeze commands is zero.

For freeze commands, there are two five-bit words in each message frame, and these are also encoded using the 2/5 code. The word digits in this system may be any decimal number from zero through ninety-nine, and the number 91 is assigned to freeze commands as indicated. The units digit (1) is encoded in the first five-bit frame and the tens digit (9) is encoded in the second five-bit frame.

The second message frame is identical to the first one to permit bit-by-bit comparison of the message at the remote station in order to provide a high degree of message security. The first frame is compared with the second one bit-by-bit, and if any two corresponding bits are not the same, the message is rejected completely. Further information on the use of bit-by-bit comparison for message security may be obtained from a copending application of the present inventors, Ser. No. 299,859, filed on August 5, 1963. FIGS. 12 and 13 of that application illustrate suitable circuitry for encoding system commands, such as smear commands and freeze commands. Therefore, the disclosure of application Ser. No. 299,859 is incorporated herein by reference.

The second message frame is followed by five uncoded neuter bits which constitute a "hole." The function of the hole at the end of a message will be described more fully in connection with FIG. 5, but its general purpose is to initiate decoding of the message after it has been received at the remote station.

The coding scheme for freeze commands only has been described fully, but it will be apparent that similar coding may be used for other messages. For instance, other system "housekeeping" commands have the same general message structure as that shown in FIG. 4. An example is the "smear" commands which are initiated by the smear encoder 33 shown in FIG. 3. The nature of smear commands and their purpose in the system is described in copending application Ser. No. 299,859 referred to previously. Briefly, they are used to assure the eventual, correct reception of qualitative messages at the central station even though they may originally be smeared or garbled due to noise on the communication channel or mutual interference between messages. For instance, if changes in qualitative inputs occur at two remote stations at the same time, those stations will simultaneously transmit messages to the central station via the common communication channel. The messages interfere with each other such that they become smeared, and they are rejected by the central station as incorrect messages. The central station then sends a smear command to all remote stations, and the smear command causes those stations which originally transmitted to repeat their messages. Each remote station has a smear timer with a preset timing cycle which is different from all other remote stations. The message is retransmitted from the remote station at the end of the smear timing cycle so that by this message traffic control technique, the retransmissions are staggered and do not interfere with each other. Thus, the qualitative messages are eventually received correctly by the central station.

Message traffic control using smear commands is not ordinarily applied to remote-to-central messages which contain quantitative data in the system being described, because quantitative data is acquired on a scheduled basis and it is therefore easier to simply recall data in the manner described previously than to go through the smear operation. However, message traffic control using smear commands could be used for quantitative messages if desired.

Referring again to FIG. 3, there is shown a functions encoder 32 for encoding all messages other than system housekeeping commands. The encoding scheme used for functional messages of this type, and specific encoding and decoding equipment is described and claimed in a copending application of Reidar G. Gabrielson, one of the present co-inventors, filed on July 16, 1964, and identified by Ser. No. 383,202. In general terms, the scheme employs variable message lengths and different levels of decoding in a manner which makes the length of individual messages compatible with the source of the information contained in them and the use to be made of that information; it is compatible with both the quiescent and scanning modes of operation; and it provides an unusually great degree of flexibility with regard to the addition of information sources and controlled equipment at remote stations after the original system has been installed and perhaps operated for some time.

Figure 5:
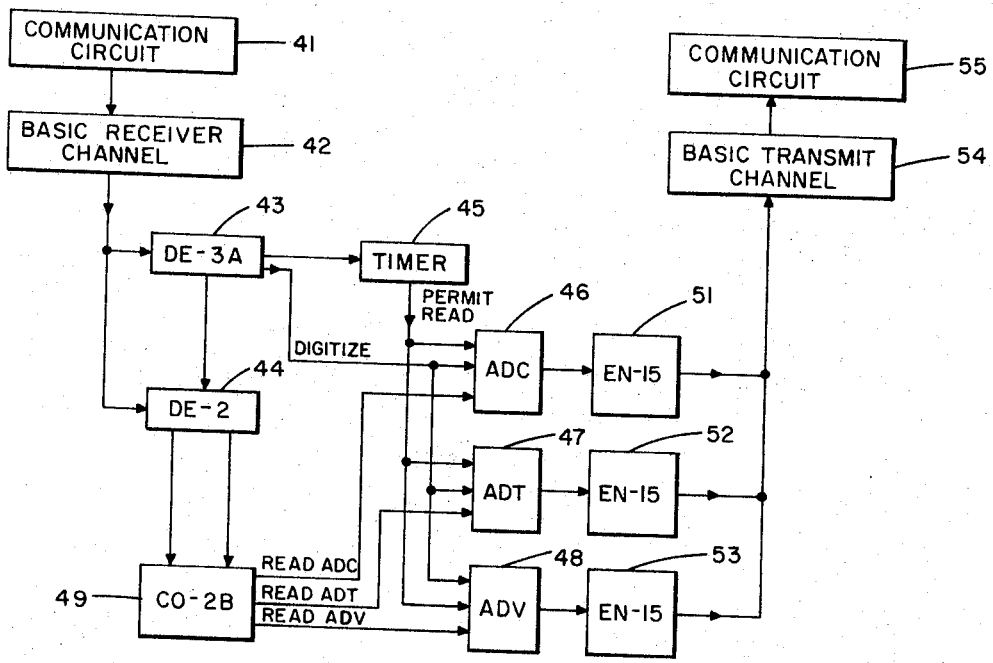
FIG. 5 is a block diagram of typical equipment for a remote station of the system of FIG. 1.

In FIG. 5 certain blocks or modules are identified by code labels since the usual electronic functional terminology is not readily applicable to them. In the description which follows, reference will be made to the level-by-level decoding described and claimed in copending application Ser. No. 383,202 mentioned previously. Such decoding equipment is compatible with the time referencing circuitry for data acquisition described herein, and can be used advantageously with the latter circuitry.

Referring now to FIG. 5, the remote station has a communication circuit 41 which receives incoming messages and supplys electrical signals representing the message bits to the basic receiving channel 42. One of the functions of the receiving channel 42 is to convert the electrical signals to current pulses and shape them to be compatible with the decoding circuitry. The current pulses are then supplied to decoding levels which, in this embodiment, consist of a first level decoder 43 with a designation DE–3A and a second level decoder 44 with a designation DE–2.

The decoders 43 and 44 are always pre-conditioned such that the first level decoder 43 is gated open at the beginning of a message and therefore accepts the message pulses, whereas the second level decoder 44 is gated closed and does not initially accept the message pulses. The decoding of a message in which the first group of pulses is a freeze command with the structure shown in FIG. 4 will be described. From Table I it is evident that the first frame of the freeze command will be the binary number 101000001111000. The second frame will be identical to the first frame and will be followed by a five-bit hole as shown in FIG. 4. The remainder of the complete message would be interrogation commands, but it should be understood that these commands might follow a considerable amount of time after the freeze command if the remote station in question is not the first one to be interrogated. As previously mentioned, however, the interrogation commands will be acted on only if they are received within the duration of the timing cycle of the permissive timer 45.

The first decoder level 43 includes message security circuitry which counts the bits of the message group and compares corresponding bits of the first and second message frames. If each two corresponding bits of the two message frames are identical, and if the message contains the correct number of bits (e.g., thirty-bits), the message security circuitry will be in a condition after the end of the message group to supply a "correct message" output at decode time. On the other hand, if the message contains other than the correct number of counts, or if any two corresponding bits are not the same, the message security circuitry within the first level decoder 43 produces an "incorrect message" output which disables the first level decoder so that it will not decode the message.

Decoding is initiated by a "decode" command generated by circuitry within the basic receiving channel 42 responsive to the five neuter bits which constitute the hole at the end of the message group. If the message has been correct, the "decode" command signal will cause the first level decoder 43 to decode the message and supply a first output to the permissive timer 45, a second output to the sensor channels 46, 47 and 48, and a third output to the second level decoder 44. If the message has not been correct, the first level decoder will not respond to the "decode" command signal.

Assuming a correct message, the first output from the first level decoder 43 starts the permissive timer 45 and the timer in turn supplys an output identified "permit read" which enables all of the sensors 46, 47 and 48 to be read. The second output from the decoder 43 causes the sensor channels 46, 47 and 48 to digitize the primary quantities which are their inputs, so that these quantities can later be read out and encoded for transmission to the central station. The third output from the decoder 43 goes to the second level decoder 44 and opens that decoder so that it will accept the next message group. At the same time, the first level decoder 43 disables itself so that it will not accept the next message group. In a working system, there might be several levels of decoders, and the third output from the first level decoder 43 could enable any one of these decoder levels.

The second level decoder 44 then receives the interrogation commands as they arrive. These commands are decoded by level 44 and routed to a second stage decoder 49 which completes the second level decoding. Decoder 49 is identified CO–2B. The first interrogation command might, for example, call for data concerning liquid level. This command would cause the CO–2B module to supply a signal for reading the ADC module 46 where the liquid level data has been digitized and stored previously. The liquid level data goes to a scanner 51 identified EN–15.

The scanners 51, 52 and 53 each have several usable steps. Each step causes five bits to be encoded by the basic transmitting channel 54 which includes an encoder of the parallel-to-serial shift register type. The transmitting channel supplys pulses serially to the communication circuit 55 for transmission to the central station. Each step may be used to encode a two-out-of-five code, a unitary code, or a BCD code or a hole (five bits of neuter). Certain steps of the scanner may be used for other functions. The scanners are stepped by the transmitting channel 54.

Messages would be read out of the other sensing channels 47 and 48 and encoded by essentially the same process as that just described. The scanners 51, 52 and 53 work in conjunction with the basic transmitting channel 54 to provide the proper spacing between message groups and proper distribution of ones, zeros and neuters within each message group.

At the end of a complete message received by the communication circuit 41 at the remote station, there will be at least ten neuter bits. These neuter bits will be recognized by the basic receiving channel 42 and it will respond to provide a "message end" output. The "message end" output pre-conditions the decoder levels 43, 44 and 49 so that only the first level decoder 43 will be open when the next message arrives.

It should be noted again that if the timing cycle of the permissive timer 45 terminates before one or more interrogation commands are received by the remote station, the remote will not act on those commands. This is because the sensing channels 46, 47 and 48 cannot be read out after the permit read signal has been removed from their enabling inputs. The "permit read" signal terminates at the end of the permissive timing cycle, so the remote station equipment will not send data back to the central station responsive to interrogation commands received after the end of the permissive timing cycle.

*Receiving and decoding circuits*

Figure 6:
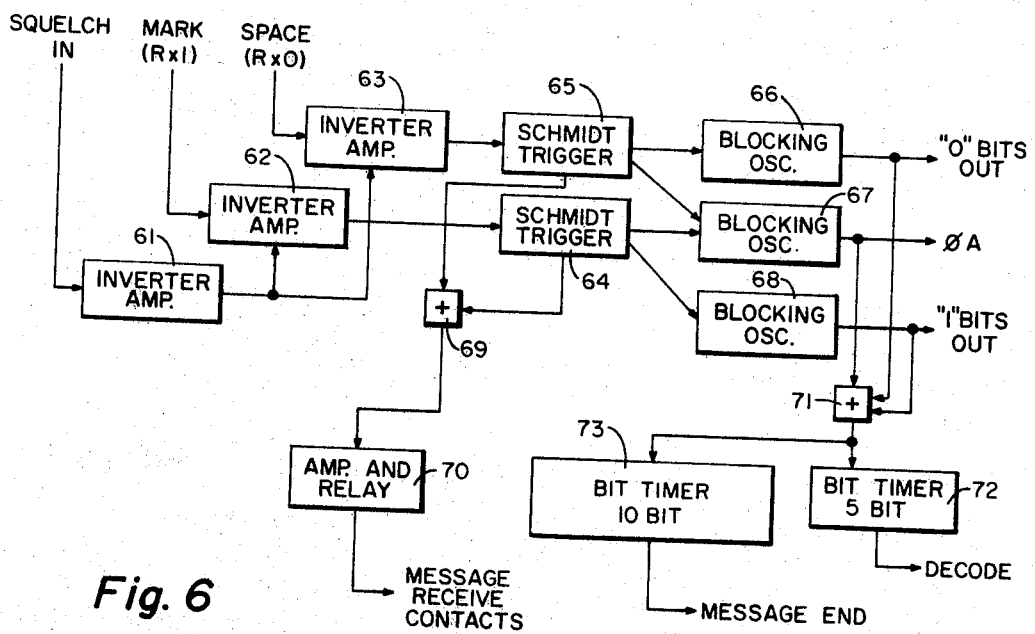
FIG. 6 is a block diagram for the basic receiving channel shown in FIG. 5.

Suitable circuitry for the basic receiving channel 42 will be described with reference to FIGS. 6, 7 and 8. FIG. 6 is a functional block diagram of the receiving channel. The channel has three inputs identified as "squelch," "mark" and "space." The squelch input is processed by an inverter amplifier 61 which responds to gate open the other two inverter amplifiers 62 and 63 so that they will accept input pulses. Pulses representing one bits are supplied to the inverter amplifier 62, and the pulses representing zero bits are supplied to the inverter amplifier 63. At the inputs to the receiving channel, the one and zero pulses are called mark and space pulses respectively in order to distinguish them from the output zero and one pulses, but this is simply a matter of using distinctive terminology. The amplified pulses are fed from the amplifiers 62 and 63 to Schmitt trigger circuits 64 and 65. A pulse at the input of either of the trigger circuits will cause it to change states and supply an output pulse. The trigger circuits perform a shaping function so that the pulses supplied to the blocking oscillators 66, 67 and 68 will have steep leading and trailing edges and will be of the desired duration and spacing.

A first output is taken from each of the Schmitt trigger circuits 64 and 65, and these are supplied to an "or" gate 69. When there is a signal at either of the two inputs of the "or" gate 69, the "or" gate supplies an output to the amplifier and relay circuit 70 to energize a relay whose contacts close and remain closed as long as pulses are being supplied to the "or" gate. Thus, these contacts remain closed for the duration of the message.

Figure 7:
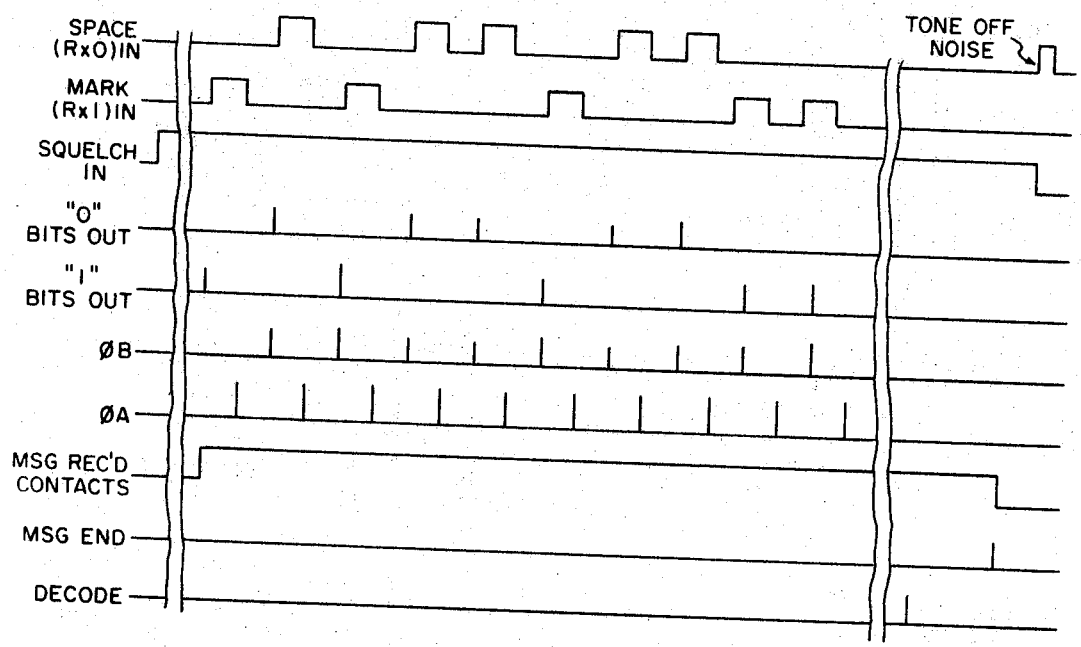
FIG. 7 is a timing diagram for the receiving channel of FIG. 6.

The timing of the events which have occurred up to this point in the description is evident from the timing diagram of FIG. 7. The space (receive zero) pulses are shown in the first line of the timing diagram and the mark (receive one) pulses are shown in the second line. The squelch input is the third line and the action of the message received contacts is depicted in the eighth line. Chronologically, the squelch input occurs first. Next, a mark pulse is received, and the leading edge of this pulse actuates the Schmitt trigger 64 which in turn actuates the "or" gate 69 to close the message received contacts as shown.

A one bit output spike is generated by the mark pulse as shown in the fifth line of the timing diagram. The one bit output is produced by the blocking oscillator 68 responsive to an input supplied from the Schmitt trigger 64 at the leading edge of the mark pulse. The next event occurs at the trailing edge of the first mark pulse. The trailing edge causes the Schmitt trigger 64 to switch back to its original state and supply an output to the blocking oscillator 67 causing it to fire and produce an output spike which is called a phase A pulse ($\phi A$). The phase A pulses are used for clocking purposes in other circuitry. Next, there is a space pulse as shown in the first line of FIG. 7, and the leading edge of this pulse causes the Schmitt trigger 65 to change states supplying an output which fires the blocking oscillator 66. The latter blocking oscillator in turn produces an output spike which is called a zero bit output and it is shown in the fourth line of FIG. 7. At the same time, an output is supplied from the Schmitt trigger 65 to the blocking oscillator 67 which resets a square loop core included in that oscillator in order to condition it to be fired again responsive to a pulse from the Schmitt trigger 64. The blocking ocsillators 66 and 68 reset automatically since they use iron cores which do not have a square loop hysteresis characteristic.

The phase A, zero and one outputs are supplied to an "or" gate 71, and when any one of these pulses is present, the "or" gate supplies a pulse to the bit timer 72 which has a five bit timing cycle and also to the bit timer 73 which has a ten bit timing cycle. The timer 72 provides the "decode" command signal which is used to read out the first level decoder 43 at the remote station. The other timer 73 provides the "message end" output which pre-conditions the first and second decoding levels 43 and 44 so that only the first level decoder 43 will accept the pulses of the next message. The "decode" command signal and the "message end" signal are shown in the last and next-to-last lines of the timing diagram of FIG. 7.

The manner in which these pulses are generated will be described briefly. The five bit timer 72 is essentially a blocking oscillator which is disabled whenever there are input pulses on the line from the "or" gate 71. If the input pulses cease for a period of time greater than two bit lengths, the timer 72 fires to produce the "decode" command signal. Thus, this timer will respond to the five neuter bits (holes) which appear at the end of each group of pulses in the message. The ten bit timer 73 is also a blocking oscillator and works in a similar manner except that it fires only if there are no pulses on the line from the "or" gate for a period of time greater than seven bit lengths. Thus, the ten bit timer fires in response to the ten neuter bits which appear at the end of a complete message.

Figure 8:
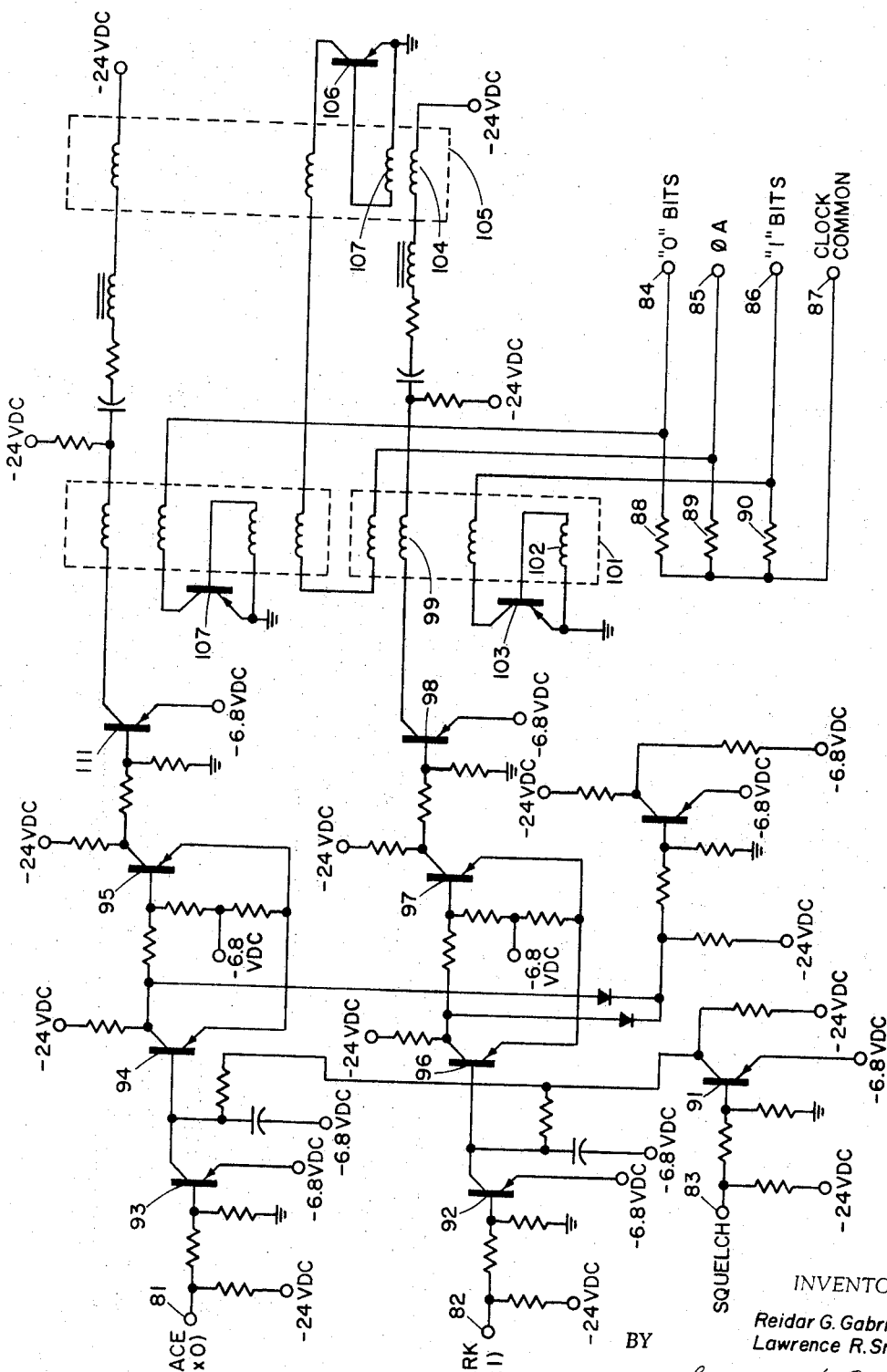
FIG. 8 is a circuit diagram for part of the receiving channel of FIG. 6.

An example of suitable circuitry for the basic receiving channel of FIG. 6 is shown in FIG. 8. The input terminals for space, mark and squelch inputs are 81, 82 and 83 respectively. The zero, phase A and one output pulses appear at terminals 84, 85 and 86 at the right-hand side of the drawing. The other output terminal 87 is for "clock common" pulses, and this is obtained by mixing the outputs through a resistive mixer formed by resistors 88, 89 and 90. A spike will appear on the "clock common" line at the leading edge and the trailing edge of every mark and space input pulse. The phase B pulses shown in the sixth line of the timing diagram of FIG. 7 correspond to every second pulse on the "clock common" line 87 and are time coincident with the leading edges of mark and space pulses.

Transistors 91, 92 and 93 together with the associated resistors, capacitors and interconnections form the inverter amplifiers 61, 62 and 63 of FIG. 6. These transistors are normally on and are turned off by the leading edge of pulses supplied to their respective inputs. Since voltage at the squelch input 83 rises first, the transistor 91 will be turned off first. When transistor 91 is conductive, it clamps the collectors of transistors 92 and 93 to −24 volts D.C. thus gating off these transistors. Transistor 91 remains off until the end of the message, so transistors 92 and 93 will accept and amplify the mark and space pulses respectively.

Transistors 94 and 95 together with the associated resistors and interconnections form the Schmitt trigger circuit 65, and transistors 96 and 97 with the associated resistors and interconnections form the other Schmitt trigger circuit 64. Transistors 94 and 96 are normally off and transistors 95 and 97 are normally on. The leading edge of a mark pulse turns transistor 96 on and it in turn switches off transistor 97. The switching off of transistor 97 turns on the normally off transistor 98 producing a current in its collector circuit which passes through a winding 99 on a toroid core represented by a dashed-line enclosure 101. The flux switching in the core 101 responsive to the increase of current in winding 99 produces a voltage in another winding 102 which causes transistor 103 to fire. Transistor 103 and core 101 form the blocking oscillator 68. The firing of transistor 103 produces a spike pulse in its collector circuit which is supplied to the one bit output line 86.

The current in winding 99 also passes through a winding 104 on another core 105 which is associated with transistor 106. Transistor 106 and the associated core 105 together form the delayed blocking oscillator 67 which supplies phase A pulses. The rise of current in winding 104 resets the core 105 but does not cause firing of transistor 106. The trailing edge of the mark pulse switches the trigger circuit formed by transistors 96 and 97 back to its original state thus turning off transistor 98. Current in winding 104 reverses at this time, and switches flux in the core 105 which induces a voltage in winding 107 of the correct polarity and sufficient in magnitude to fire transistor 106 producing an output current spike in its collector circuit. This current pulse is supplied to the phase A output line 85.

The leading edge of a space input pulse produces a zero output pulse on line 84, and the trailing edge of the space pulse produces a phase A pulse on line 85 in a similar manner. In response to the leading edge of the space pulse, transistor 94 turns on, transistor 95 turns off, transistor 111 turns on, and transistor 107 fires to produce an output current spike on the zero bit line 84. In response to the trailing edge of the space pulse, transistor 94 turns off, transistor 95 turns on, transistor 111 turns off and transistor 106 fires to produce a current spike on the phase A output line 85.

Figure 9:
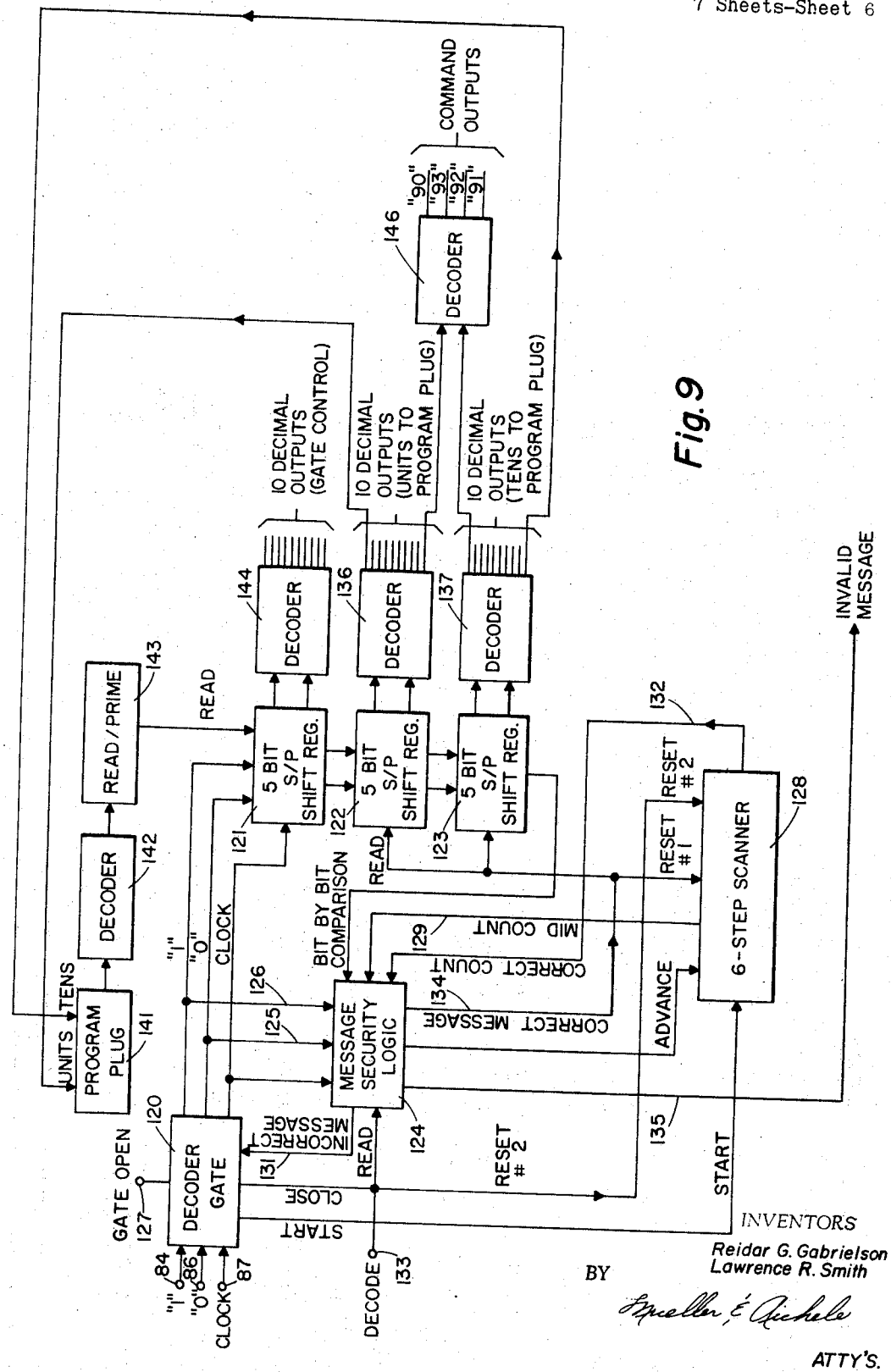
FIG. 9 is a block diagram for a decoder identified as DE–3A in FIG. 5.

Terminals 84, 86 and 87 of FIG. 8 are also shown as the input terminals to the decoder gate 120 of FIG. 9. FIG. 9 is a functional block diagram of the first level decoder 43 of FIG. 5. The one and zero pulses which arrive at terminals 84 and 86 are routed through the decoder gate 120 and are fed serially into three five-bit shift registers 121, 122 and 123 connected in tandem. The total capacity of the three shift registers is fifteen bits, i.e., the length of each of the two message frames which, together with a hole, make up the freeze command as shown in FIG. 4.

Assuming that the incoming message is a freeze command, the first message frame of this command will load the shift registers 121, 122 and 123 to capacity. As the second message frame arrives, it will shift out serially the first message frame which has been temporarily stored in the shift registers. The serial output from the shift register 123 may be considered as the first message frame delayed, and it is supplied to the message security logic circuitry 124 where it is compared bit-by-bit with the second message frame being supplied directly to the message security circuitry via inputs 125 and 126. Clock pulses arriving at terminal 87 of the decoder gate 120 are routed to the message security logic circuitry 124 and to the shift register 121 in order to provide the necessary timing for the message security logic and the shift register.

The decoder gate 120 is opened initially by a signal appearing at terminal 127. The opening of the decoder gate produces a "start" output which is supplied to a six-step scanner 128 causing it to begin its scan.

The message security logic circuitry 124 includes a counter which counts the bits arriving at inputs 125 and 126. For every five counts registered by the counter of the message security logic, it produces an output called an "advance" pulse which steps the scanner 128 one step. After the first fifteen-bit message frame has been received, the shift registers 121, 122 and 123 are full. The next bit (i.e., the first bit of the second message frame) forces the first bit of the delayed first message frame out of shift register 123.

By this time the scanner 128 has advanced three steps and is midway through its counting cycle. At this time, the scanner produces an output, called a mid-count output, which goes to the message security logic circuitry over line 129. The mid-count pulse switches the messages security logic in such a manner that the first bit of the delayed first message frame emerging from the shift register 123 is compared with the first bit of the second frame being gated through the decoder gate and appearing on either line 125 or line 126. If these two corresponding bits are identical, the counter of the message security logic advances one count. However, if these two bits are not the same, the message security logic produces an "incorrect message" output pulse on line 131 which immediately closes the decoder gate 120. If the decoder gate is closed in this manner, the rest of the message will be rejected.

As long as each two corresponding bits of the first and second message frames are identical, the counter of the message security logic will continue to advance. By the time the entire message has been received, the shift registers 121, 122 and 123 are loaded to capacity with the second message frame, which, of course, contains the full information content of the message group. Meanwhile, the scanner 128 has been advanced three more steps to the end of its scanning cycle. At this time, an output is produced by the scanner called the "correct count" output, and this output is supplied to the message security logic via line 132.

A short time after the "correct count" output, the "decode" command signal arrives at terminal 133. The "decode" signal turns off the gate 120 and reads out the message security logic. If the logic circuitry has counted thirty bits, it produces the "correct message" pulse which goes via line 134 to the scanner 128 and to the shift registers 122 and 123. The "correct message" pulse resets the scanner 128 and reads out the information stored in the shift registers 122 and 123.

The parallel outputs from shift registers 122 and 123 are supplied to decoders 136 and 137 each of which has ten output lines. The outputs from decoder 136 provide the "units" digit of the message, and the ouputs from decoder 137 provide the "tens" digit of the message. One of the outputs from each of the two decoders 136 and 137 is fed via program plug 141 to another decoder 142 which provides a unique two-decimal-digit output pulse. The latter pulse activates a read/prime circuit 143 which supplies reading current to the other five-bit shift register 121 which serves as a gate control. The information content of the third five-bit digit of the message is decoded by the decoder 144 at read time, and the outputs from this decoder are used to control the decoder gate 120 and also similar decoder gates of the second level decoder 44 (FIG. 5) or some other decoder level if provided in the system.

"Units" outputs from the decoder 136 and "tens" outputs from the decoder 137 are fed to another decoder 146 which provides four command signals corresponding to the decimal digits 90, 91, 92 and 93. In the particular embodiment being described, the decimal digit 91 is assigned to the freeze command, and therefore the output which corresponds to the freeze command is identified as a "91" output from the decoder 146.

If the counter of the message security logic has registered a count of something other than thirty, it produces an "invalid message" output on line 135. For example, if the message happened to contain thirty-one bits rather than the correct number (thirty bits), an "invalid message" output would be produced on line 135 in response to the "decode" signal. There will be no "correct message" output on line 134, and consequently the shift registers 121, 122 and 123 will not be read out, and the message will not be decoded. The "decode" signal, in addition to reading the message security logic, closes the decoder gate 120 and will reset the scanner 128 in case the message was incorrect and no "correct message" output appeared on line 134 to reset the scanner.

Figure 10:
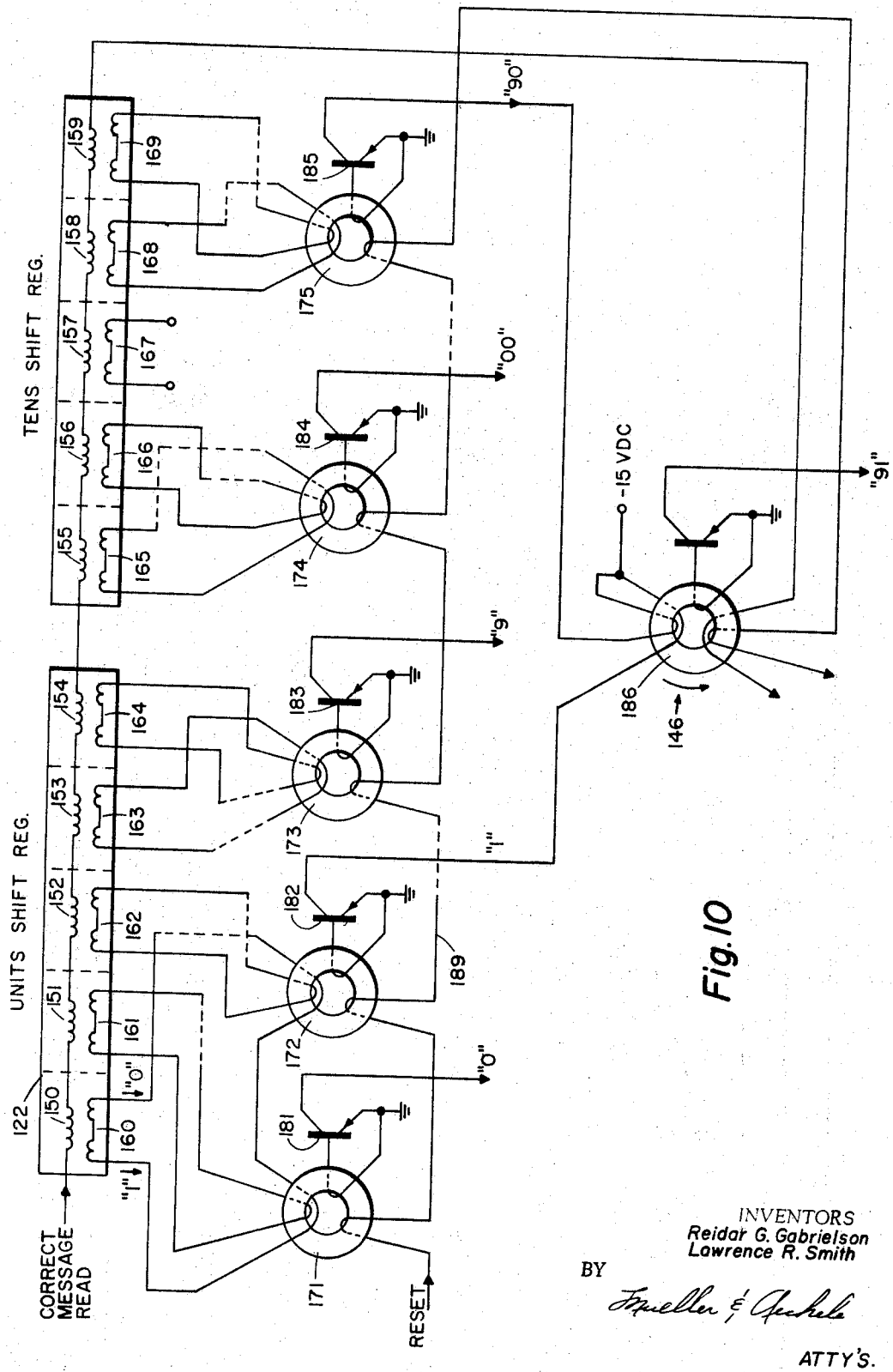
FIG. 10 is a circuit diagram for the decoder of FIG. 9.

FIG. 10 shows suitable circuits for the portions of the shift registers 122 and 123 and the decoders 136, 137 and 146 having to do with the decoding of freeze commands. Only the "units" shift register 122 and the "tens" shift register 123 are shown in FIG. 10 since the gate control shift register 121 is not directly concerned in the decoding of freeze commands.

The "correct message" pulse which is supplied from the message security logic 124 passes through a series of read windings identified 150 through 159. There is one read winding for each of the ten stages which make up the two shift registers 122 and 123. These shift registers are preferably constructed using true and complement cores in the manner described and claimed in application Ser. No. 229,852, filed on Oct. 11, 1962, by Lawrence R. Smith and assigned to the present assignee. The output windings for the ten stages of the shift registers are identified by the reference numerals 160 through 169.

For a freeze command, it will be evident from Table I set forth previously that the binary number stored in the shift registers 122 and 123 at the end of a freeze command will be 1010000011. At read time, outputs will be produced in the windings 160 through 169. The polarity of the output signals determines whether that signal is a binary one or a binary zero. The polarities for one and zero outputs are indicated by arrows for the output winding 160 and polarities for the other output windings are the same.

At read time, a binary one output will appear in windings 160, 162, 168 and 169. It may be noted that each of the output windings is part of a loop, and the loops link selected ones of the cores 171 through 175 in the same direction. Since the loops of windings 160 and 162 link core 172 in the same direction, and since these two windings both receive a binary one in the example being described, there will be sufficient flux switching in core 172 to turn on transistor 182. The firing of transistor 182 produces an output, which is the "1" decimal-digit output supplied to the decoder 146. At the same time, transistor 185 is fired due to the binary ones which appear in windings 168 and 169 simultaneously. The firing of transistor 185 produces an output which is the "90" which is supplied to decoder 146. The "90" output and the "1" output link core 186 of the decoder 146 in the same direction.

The reading circuit including windings 150 through 159 also passes through core 186, and the read current pulse should be at least as wide as the output pulses supplied by transistors 181 through 185 in order to bias the core 186. The reading current tends to keep flux in the counterclockwise direction in core 186 while outputs are applied to it from transistors 182 and 185. However, since there are two input windings bucking the bias winding, and since all of the windings have only one turn, two simultaneous inputs in the same direction will cause flux to switch clockwise in core 146. This flux switching is of the correct polarity and is sufficient in magnitude to turn on the transistor coupled to core 186 producing a current pulse in its collector circuit which is the "91" output corresponding to the freeze command.

Line 189 receives a clocking pulse which serves to reset cores 171 through 175, and this current will also reset core 186 if it has not already been reset by the reading current. If the read pulse is wider than the pulses supplied from transistors 182 and 185, it will reset core 146, and in this case the turn of line 189 on core 186 is only a safety precaution to further assure resetting of that core.

It may be noted that since each remote station has its own permissive timer, the limitation on the period of time during which data can be acquired is controlled wholly at the remote stations. Once the timing cycle has started, it is independent of any action by the central station, and therefore is not affected by the limitations of the communication channel or the operator. Therefore, the time-referencing operation is "fail-safe" in this respect.

There are other ways of accomplishing data acquisition with a controlled time reference, and the invention in its broader aspects is not limited to the specific embodiment described and illustrated herein, although that embodiment is the best mode contemplated of practicing the invention. For example, it is possible to use one of the system housekeeping commands other than the freeze command and the smear command to reset the storage associated with the sensing channels in order to pre-condition the system for a subsequent freeze command. This resetting function can be done at the end of a system inventory. The timing of the reset command can be controlled wholly by an operator, or it may be done automatically by means of a timer provided at the central station to initiate transmission of the rest command at the end of an inventory. In this case, permissive timers are not used in the remote station equipment. If time referencing for data acquisition is accomplished as just described, it is dependent on the communication channel and therefore is not fail-safe to the extent that the preferred embodiment is.

It may be noted that each remote station is equipped to send back data corresponding to several conditions monitored at that station. The time referencing for data acquisition applies to any one remote station since it provides a controlled time reference for all data sent from that station, even though messages containing different data are sent at different times. However, the fullest advantage of the invention is obtained when several remote stations are involved.

*Summary*

It is evident from the foregoing description that the invention provides data acquisition in a supervisory control system in a manner such that quantitative data received at the central station represents conditions occurring at the same reference time, even though the data is not all received at the central station at the same time. A system inventory may take a considerable period of time, but all data gathered in the inventory is referenced to the same instant of time. This greatly facilitates analysis of the primary quantities and the conditions being supervised and controlled by the system, and yet the circuitry for accomplishing the time referencing is straightforward and reliable.

What is claimed is:

1. A supervisory control system with which information can be gathered at a central station from a plurality of remote stations by messages sent from different remote stations at different times but representing conditions existing at those remote stations at the same reference time, said system including in combination:
    (a) a first sub-system adapted to be located at a central station and including first transmitting means, first receiving means, and first data processing means,
    (b) a plurality of second sub-systems adapted to be located respectively at different remote stations and each including second transmitting means, second receiving means, and second data processing means,
    (c) encoding means in said first data processing means for causing transmission of a uniquely coded all-stations freeze command by said first transmitting means,
    (d) decoding means in each of said second data processing means and each capable of decoding said all-stations freeze command,
    (e) storage means in each of said second data processing means controlled by said decoding means and responsive to decoding of said all-stations freeze command by said decoding means to store information representing different conditions at a reference time determined by receipt of said freeze command and which is the same for all of said conditions,
    (f) and means in each of said second data processing means for causing said storage means to supply such time-referenced information to said second transmitting means for sequential transmission to said first sub-system responsive to interrogation commands from said first sub-system.

2. The supervisory control system of claim 1 with said encoding means of said first data processing means further being capable of causing transmission of a second uniquely coded all-stations command different from the first such command, and said decoding means of said second data processing means being capable of decoding said second all-stations command to provide a signal for resetting said storage means after time-referenced information originally stored thereby has been transmitted to said first sub-system.

3. The supervisory control system of claim 2 in which said first data processing means further includes timing means cooperating with said encoding means and said transmitting means in order to cause transmission of said second all-stations command at the end of a timing cycle for limiting the time during which time-referenced information can be acquired from said second sub-system by said first sub-system.

4. The supervisory control system of claim 1 with each of said second data processing means further including timing means controlled by said decoding means to provide a timing cycle initiated by said uniquely coded freeze command for limiting the time during which information can be acquired from said second sub-systems by interrogation, said timing means being responsive to decoding of a said command by said decoding means to enable said storage means to supply time-referenced information to said second transmitting means during said timing cycle and thereafter to prevent the transmission of said information to said first sub-system.

5. A supervisory control system with which information can be gathered at a central station from a remote station by messages sent from the remote station at different times but representing conditions existing at the remote station at the same reference time, said system including in combination:
    (a) a first sub-system adapted to be located at a central station and including first transmitting means, first receiving means, and first data processing means,
    (b) a second sub-system adapted to be located at a remote station and including second transmitting means, second receiving means, and second data processing means,
    (c) encoding means in said first data processing means for causing transmission of a uniquely coded freeze command by said first transmitting means,
    (d) decoding means in said second data processing means capable of decoding said uniquely coded freeze command,
    (e) storage means in said second data processing means controlled by said decoding means and responsive to decoding of a said uniquely coded freeze command by said decoding means to store information representing a plurality of different conditions at a reference time which is the same for all of said conditions,
    (f) and means in said second data processing means for causing said storage means to supply time-referenced information to said second transmitting means for sequential transmission to said first sub-system responsive to interrogation commands from said first sub-system.

6. A supervisory control system with which information can be gathered at a central station from a remote station by messages sent from the remote station at different times but representing conditions existing at the remote station at the same reference time, said system including in combination:
    (a) a central sub-system located at a central station and including first transmitting means, first receiving means, and first data processing means,
    (b) a remote sub-system located at a remote station and including second transmitting means, second receiving means, and second data processing means,
    (c) encoding means in said first data processing means for causing transmission of a uniquely coded freeze command by said first transmitting means,
    (d) decoding means in said second data processing means capable of decoding said uniquely coded freeze command,
    (e) timing means in said second data processing means controlled by said decoding means and responsive to decoding of a uniquely coded freeze command by said decoding means to provide a timing cycle during which information may be acquired by said first sub-system from said second sub-system,
    (f) storage means in said second data processing means controlled by said decoding means and responsive to decoding of said uniquely coded command by said decoding means to gather and store information representing a plurality of different conditions at a reference time which is the same for all of said conditions at all remote stations,
    (g) said timing means being responsive to decoding of a said uniquely coded command by said decoding means to start said timing cycle, and to enable said storage means to supply time-referenced information to said second transmitting means only during said timing cycle,
    (h) and means in said second data processing means for causing said storage means to supply time-referenced information to said second transmitting means for sequential transmission thereof to said first sub-system during said timing cycle responsive to interrogation commands from said first sub-system.

7. A supervisory control system with which information can be gathered at a central station from a plurality of remote stations by messages sent from different remote stations at different times but representing conditions existing at those remote stations at the same reference time, said system including in combination:
   (a) a central sub-system located at a central station and including first transmitting means, first receiving means, and first data processing means,
   (b) a plurality of remote sub-systems located respectively at different remote stations and each including second transmitting means, second receiving means, and second data processing means,
   (c) encoding means in said first data processing means for causing transmission of a uniquely coded all-stations freeze command by said first transmitting means,
   (d) decoding means in each said second data processing means capable of decoding said all-stations freeze command,
   (e) timing means in each of said second data processing means controlled by said decoding means and responsive to decoding of a said all-stations freeze command by said decoding means to provide a timing cycle during which information may be acquired by said central sub-system from said remote sub-systems by sequential interrogation thereof,
   (f) storage means in each of said second data processing means controlled by said decoding means and responsive to decoding of said all-stations freeze command by said decoding means to gather and store at each said remote station information representing a plurality of different conditions at a reference time which is the same for all such conditions at all of said remote stations,
   (g) each said timing means being responsive to decoding of a said all-stations command by the associated decoding means to start said timing cycle, and to enable said storage means to supply time-referenced information to said second transmitting means only during said timing cycle,
   (h) and means in each of said second data processing means for causing said storage means to supply time-referenced information to said second transmitting means for sequential transmission thereof to said central sub-system during said timing cycle responsive to interrogation commands from said central subsystem.

8. The supervisory control system of claim 5 in which said encoding means of said first data processing means is adapted to encode said command into first and second identical successive message frames of binary bits,
   said second data processing means includes message security means comprising a shift register coupled to said second receiving means for receiving said message frames serially and having a capacity to store only one said message frame so that in operation the first frame is shifted out of said shift register serially as the second frame enters said register,
   a comparator coupled to said second receiving means and to said shift register for simultaneously receiving said second message frame and the delayed first message frame provided by said register,
   said comparator being operative to compare each of the corresponding bits of said frames with each other on a bit-by-bit basis,
   a counter coupled to said comparator for counting the bits of the first message frame and thereafter counting comparisons made by said comparator,
   and said message security means providing a correct message output for causing said decoding means to decode said command only when said counter contains a correct count after the end of said command.

9. A data logging system, including in combination,
   a central station having a transmitter, a receiver, and data processing means,
   a plurality of remote stations each having a transmitter, a receiver, and data processing means,
   a communication network joining said stations,
   said central station processing means operative to encode an all-stations command signal and cause said central station transmitter to send said signal to said communication network,
   said remote stations all being responsive to receipt of said signal from said network to simultaneously perform respective functions which simultaneously generate indicia signals and to store such indicia signals,
   and timing means in each of said remote stations responsive to receipt of said command signal to enable transmission of said stored indicia signals within a given time period and operative to inhibit such transmission upon expiration of said given time period.

10. The system of claim 8 further including means operative upon expiration of said given time period to cause erasure of said stored indicia signals at all remote stations.

11. A supervisory control system with which information can be gathered at a central station from a plurality of remote stations by messages sent from different remote stations at different times but representing conditions existing at those remote stations at the same reference time, said system including in combination:
   (a) a first sub-system adapted to be located at a central station and including first transmitting means, first receiving means, and first data processing means,
   (b) a plurality of second sub-systems adapted to be located respectively at different remote stations and each including second transmitting means, second receiving means, and second data processing means,
   (c) encoding means in said first data processing means for causing transmission of a uniquely coded all-stations freeze command by said first transmitting means,
   (d) decoding means in each of said second data processing means and each capable of decoding said all-stations freeze command,
   (e) timing means in each of said second data processing means controlled by the associated decoding means to provide a time reference timing cycle during which information may be acquired by said first sub-system from said second sub-systems by sequential interrogation thereof,
   (f) and storage means in each of said second data processing means controlled by said decoding means and responsive to decoding of said all-stations command by said decoding means to store information representing different conditions at a reference time determined by receipt of said freeze command remote stations,
   (g) and each of said timing means being responsive to decoding of said all-stations freeze command by said decoding means to start said timing cycle, and to enable said storage means to supply the time-referenced information stored thereby to the second transmitting means associated therewith only during said timing cycle.

References Cited
UNITED STATES PATENTS

| | | |
|---|---|---|
| 3,045,210 | 7/1962 | Langley. |
| 3,223,974 | 12/1965 | Kok et al. _____ 340—146.1 |
| 3,244,805 | 4/1966 | Evans _____ 340—163 XR |

NEIL C. READ, *Primary Examiner.*

D. J. YUSKO, *Assistant Examiner.*